No. 809,354. PATENTED JAN. 9, 1906.
E. O. BARTLETT & W. F. GORDON.
METHOD OF DENSIFYING AND ELIMINATING AIR AND GAS FROM MASSES OF PULVERULENT METALLIC SALTS AND OXIDS.
APPLICATION FILED APR. 29, 1903.
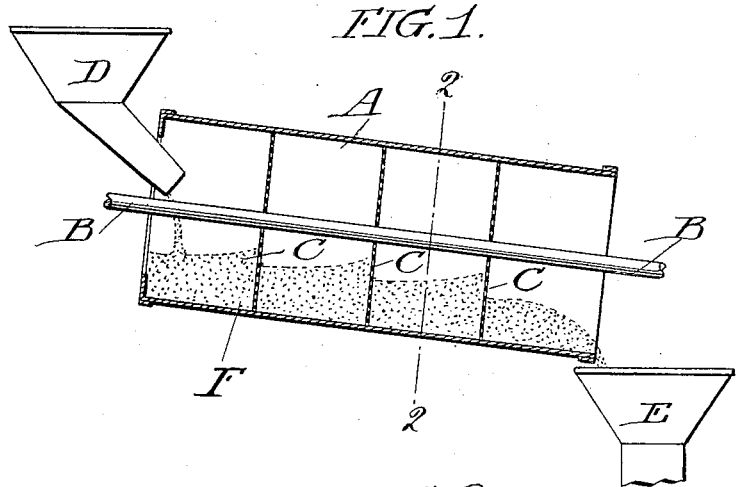
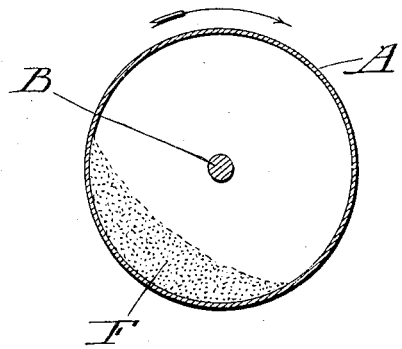
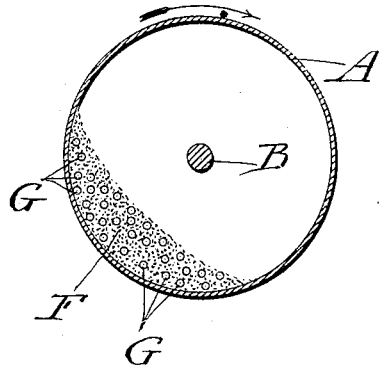
WITNESSES:
INVENTORS.

UNITED STATES PATENT OFFICE.

EAYRE O. BARTLETT AND WILLIAM F. GORDON, OF JOPLIN, MISSOURI.

METHOD OF DENSIFYING AND ELIMINATING AIR AND GAS FROM MASSES OF PULVERULENT METALLIC SALTS AND OXIDS.

No. 809,354.      Specification of Letters Patent.      Patented Jan. 9, 1906.

Application filed April 29, 1903. Serial No. 154,786.

*To all whom it may concern:*

Be it known that we, EAYRE O. BARTLETT and WILLIAM F. GORDON, citizens of the United States, residing in Joplin, in the county of Jasper, in the State of Missouri, have invented a certain new and useful Improvement in Methods of Densifying and Eliminating Air and Gas from Masses of Pulverulent Metallic Salts and Oxids, of which the following is a true and exact description, reference being had to the accompanying drawings, which form a part thereof.

Our invention relates to the treatment of masses of pulverulent salts and oxids for the purpose of eliminating air and gas therefrom and densifying the mass, particularly as a preliminary to packing such masses in barrels or other receptacles for shipment.

Heretofore great difficulty has been met with in packing pulverulent metallic salts or oxids, particularly such as are made by what may be called the "sublimation" of the material, such as the materials known as "sublimed" white lead or oxid of zinc, such materials consisting of exceedingly small light particles and as collected embracing in the mass large quantities of air and gas, which makes it difficult and costly to pack the material in barrels or other receptacles.

The object of our invention is, primarily, to eliminate the greater portion of the air and gas contained in such pulverulent masses, and we have discovered that this can be done economically and with practical thoroughness by subjecting the masses of the pulverulent material to the stirring action effected by treating the mass in a rotating cylinder, by the action of which the said mass is caused to rotate, so to speak, in the cylinder and in such a manner as to cause its particles to constantly shift their relative positions, the action being that the lower part of the mass is constantly carried up by the rotating cylinder and the angle of the inclined upper face of the mass shifted to one greater than the angle of repose, so that the upper portion is constantly sliding downward over the lower portion, the motion and weight of the mass resulting in the quite rapid elimination of the contained air and gas and the densifying of the mass, which after treatment can be packed with little difficulty.

Our method and invention can be practiced in pretty much any sort of a rotating receptacle, and the masses to be densified can either be treated in batches or continuously. A certain amount of advantage is also gained by employing in the revolving receptacle loose balls which mix with the material under treatment and by their weight and motion facilitate the densifying of the mass.

In the drawings we have indicated some convenient forms of apparatus for the practice of our invention.

Figure 1 shows an inclined cylinder with partitions; Fig. 2, a section on line 2 2 of Fig. 1, and Fig. 3 a similar section showing the use of balls in connection with the pulverulent mass.

A indicates the rotating cylinder or receptacle, which, as shown, is represented as attached to a driving-shaft B, but of course can be supported and rotated by any convenient mechanism. The cylinder is represented as inclined, so as to feed the material through it; but any plan or means for feeding the material or charging or discharging it to or from the cylinder may be employed. We have shown in Fig. 1 perforated partitions C C C, which in an inclined cylinder are useful devices for checking and regulating the feed of the mass, but are not essential.

D is a feed-hopper, and E a receiving-hopper.

F indicates the pulverulent mass under treatment, and G, Fig. 3, shows the balls which we sometimes use in admixture with the mass to be treated.

Having now described our invention, what we claim as new, and desire to secure by Letters Patent, is—

The method of densifying and eliminating air and gas from dry masses of pulverulent metallic salts and oxids, which consists in treating a mass of such pulverulent material in a rotating receptacle to cause the mass as a whole to revolve in the receptacle and its component particles to constantly shift their relative positions as described.

EAYRE O. BARTLETT.
        WILLIAM F. GORDON.

Witnesses:
  ALBERT BAKER,
  ROBT. C. MCCONNEL.